United States Patent [19]

Paul

[11] Patent Number: 4,855,891
[45] Date of Patent: Aug. 8, 1989

[54] POWER SUPPLY DESIGN

[75] Inventor: Jon D. Paul, San Franciso, Calif.

[73] Assignee: Eventide Inc., Little Ferry, N.J.

[21] Appl. No.: 100,253

[22] Filed: Sep. 23, 1987

[51] Int. Cl.$^4$ ............................................. H02H 7/122
[52] U.S. Cl. ........................................ 363/56; 363/26;
363/40; 363/61; 363/134; 336/206
[58] Field of Search ..................... 363/24, 25, 26, 40,
363/56, 61, 133, 134; 336/198, 206

[56] References Cited

U.S. PATENT DOCUMENTS

| | | | |
|---|---|---|---|
| 3,898,549 | 8/1975 | Mitchell | 363/26 |
| 4,239,077 | 12/1980 | Dixon et al. | 336/206 |
| 4,325,113 | 4/1982 | Tomlie, Jr. | 363/26 |
| 4,449,111 | 5/1984 | Nakajima | 336/206 |
| 4,566,059 | 1/1986 | Gallios et al. | 363/56 |
| 4,586,118 | 4/1986 | Mihalka | 363/56 |
| 4,594,650 | 6/1986 | Kinbara | 363/56 |

Primary Examiner—Patrick R. Salce
Assistant Examiner—Anita M. Ault
Attorney, Agent, or Firm—Ostrolenk, Faber, Gerb & Soffen

[57] ABSTRACT

Improvement for power supplies include a protection circuit having a first L-C filter network, a second L-C filter network and a voltage clamping device such as a zener diode which is disposed between the two L-C filter networks. The protection circuit reduces the magnitude of overvoltage input transients which might otherwise damage the internal components of the inverter. For generating very high output votlages, the power supply includes a high voltage transformer and a Crockoft-Walton voltage multiplier coupled thereto. The high voltage transformer is coupled to an inverter through a coupling circuit which includes a capacitor in one leg of the primary winding and a parallel connected resistor/inductor in the other leg of the primary winding of the high voltage transformer. The high voltage transformer is formed of a multi-sectioned bobbin which is defined around an axially extending core. A first insulating tape formed of a material having good insulation resistance and a relatively low dielectric constant is wound in the channel and the secondary winding is then wound around the insulation, substantially filling the bobbin. Thereafter a second similar insulation is wound around the secondary winding and the primary winding is wound over the second insulation.

10 Claims, 3 Drawing Sheets

FIG. 1.
PRIOR ART

POWER SUPPLY DESIGN

BACKGROUND OF THE INVENTION

The present invention relates to power supplies for supplying regulated DC voltages and more particularly to a switch mode DC to DC inverter with: an improved input filter which provides protection against high voltage excursions or spikes at the input to the inverter; a high voltage multiplier coupled to the inverter by a unique coupling circuit which stabilizes and provides a more closely regulated high voltage output; and an improved high voltage transformer.

Nowadays, practically all electrical instruments and appliances incorporate logic, control and computer circuits and/or display devices such as CRT's and the like. These circuits and devices must be provided with power in the form of one or more well regulated and stable DC voltages.

The DC voltages are generated with power supplies, sometimes referred to as power processors, which derive electrical power from a comparatively unregulated AC or DC input voltage source having a nominal voltage level. The power processors convert the source voltage to the one or more required DC voltages and carefully regulate the generated voltages to assure that they meet a predetermined set of specifications, regardless of fluctuations in the input voltage, loading, etc.

By way of example, the main power source in many airplanes is a DC voltage of 28 volts which is distributed throughout the airplane. Where needed, power processors are provided to receive this relatively poorly regulated DC power, to convert it to, for example, a well regulated 5 volt DC output for driving logic/computer circuits, $+/-15$ volts DC outputs for various analog circuits or any other DC voltage which a particular application may require.

Certain devices require very high DC voltages. A CRT display is a good example. It requires a DC voltage of between 5 to 25 kilovolts. Such an output can also be provided from the 28 volt DC source.

In recent automobile models power processors convert the widely fluctuating input voltage which is provided from the automobile's 12 volt battery to other stable and well regulated DC voltages for powering sensitive electrical circuits such as computer, logic or control circuits.

Power processors may include in them a regulator, in the form of a DC to DC inverter and a regulator circuit therefor, the overall regulator being operable either linearly or in switch mode. Switch mode regulators are relatively more complex. They operate on the principle of "chopping" an input DC source voltage into an "anti-phased" square wave signal having a voltage level that enables the square wave to be rectified to obtain a desired DC voltage level. Switch made inverters/regulators generate electromagnetic interference and voltage spikes which require more complicated and costly filters, as compared to purely linear regulators.

Nonetheless, switch mode inverters are popular because of their ability to provide significantly higher power conversion efficiencies and because of their smaller physical dimensions.

Switch mode power processors are often exposed to applications in which the processors must handle source input DC voltages which are subject to substantial transients. For example, in aircraft, automobiles, factories and like, equipment such as lighting ballasts, motor controls and similar inductive loads are powered from the same primary power source from which the regulated DC voltage is produced. This generates abnormal input transient voltages and energies which propagate into the power processors and which could expose the sensitive electronic components in them to voltage levels which are substantially beyond the maximum voltage rating of such components. Such input transients may also be induced by lightning, lamp ignitors, inductive loads or the like.

Protection against input transients is conventionally provided by expensive clamping components such as metal oxide varistors, transient absorbing zeners and a variety of filtering elements. The known protection methods are heavily dependent upon the clamp ratio which is associated with the selected clamping/transient-absorbing device. The clamp ratio is the ratio of the voltage at which the protective device begins to conduct to the voltage which appears across the protective device when the maximum current is flowing through the device. Ratios of 1.42 to 2 are not uncommon. This means that an excessive voltage is still present at the protection device, even while the device operates in its protective mode. The energy of this excessive voltage is able to leak into and damage the electronic components within the power processor. The only choice is to use overspecified and more expensive switching elements (transistors) in the power processor, which is undesirable.

Further, in given applications, inverters are designed to generate a very high DC voltage output for powering cathode-ray tube (CRT) displays, photomultipliers and the like. The output voltage may be in the range of 5 to 25 kilovolts or even higher. If the inverter generates only the high voltage output it is common to include a feedback network between the high voltage output and the controller for the inverter. A feedback network increases the cost and the complexity of the inverter.

Other DC inverters are known which generate both low voltage outputs and a high voltage output. If only the low voltage main outputs are stabilized and the design relies on the ability of the high voltage output to "track" the regulation that is applied to the low voltage output, the high voltage output may be only loosely regulated. The reason for this may be explained as follows.

Generally, a DC to DC inverter operates at ultrasonic frequencies and a high voltage transformer is deployed for stepping up the AC square wave output of the inverter to the required high voltage level which is then rectified and filtered to obtain the high DC output. High voltage transformers for stepping up a relatively low voltage to a multi-kilovolt output have very high secondary to primary winding ratios, for example, 50 to 100:1. These high-ratios magnify the effects of the inherent shunt capacity and leakage inductance present in all transformers which adversely affect the inverter to which the transformer is coupled. Designers have, therefore, turned to transformers with lower turn ratios.

To obtain the necessary multi-kilovolt output, the technique of voltage multiplication using a network of multiple diodes and resistors which are connected in accordance with the well known Crockoft-Walton method for voltage multiplication have been used by those skilled in the art. Voltage multipliers provide however relatively poor load regulation. The poor regulation is attributed in part to the presence of a parasitic shunt capacitance in the transformer. This shunt capacitance stores energy and delivers it to the voltage multiplier cyclically. During the transition intervals of the square wave waveform of the inverter, voltage overshoots are created due to the formation of a tuned circuit with the parasitic and discreet inductances and capacitances which are elsewhere present in the power processor.

The net result is voltage overshoot and ringing which causes the voltage multiplier to charge to the peak of these overshoot/ringing voltages, particularly when the output load is relatively light. On the other hand, under heavy loads, the charging peaks are damped and the output voltage falls, producing a comparatively poorly regulated output.

The voltage overshoot and ringing effect results in part from the shunt/stray capacitance at a secondary of the high voltage transformer which is reflected into the primary winding of the driving inverter. This shunt/stray capacitance is seen at the primary winding as a larger capacitance due to the magnification of this shunt capacitance by the square of the transformer turns ratio. It therefore presents to the inverter a highly capacitive load. This is undesirable because it increases switch stresses in the inverter and unnecessarily consumes current which could otherwise be drawn by the low voltage loads of the inverter.

Although the foregoing effects can be reduced with a resistor connected in series with the primary of the high voltage transformer, the solution is impractical as it causes power loss and greatly reduces efficiency.

The above-mentioned shunt capacitance of a transformer poses a problem for any design which incorporates transformers, but especially for high voltage/high frequency transformers in inverter applications. The shunt capacitance is produced by the insulation on wires and from insulating materials in the transformer which are charged by voltage fields within the transformer. Since, in switch mode inverters, the transformer primary winding is driven by a high frequency square waveform, with each transition of the square wave, the transformer shunt capacitance is charged and discharged, alternatively storing and delivering energy. This energy transfer causes the overshoots and the ringing which adversely affect voltage regulation and power conversion efficiency.

The secondary winding of a high voltage transformer has many turns of relatively fine wire and this produces a significant self capacitance. Typically this self capacitance could be 10 to 100 picofarads. A capacitance of this magnitude stores considerable energy in view of the high voltage charging it, in accordance with $E = \frac{1}{2}CV^2$.

High voltage transformers are particularly susceptible to self capacitance effects because the energy stored in them is proportional to the square of the voltage multiplied by the capacitance. Therefore, as the transformer turns ratio is increased, the stored energy increases with the square of the turns ratio.

The art identifies two types of capacitances with high voltage transformers. One is an interwinding capacitance, consisting of the capacitance between the individual turns of the transformer. The other is the winding-to-ground capacitance from each turn of the transformer, with the core being considered as ground. Since one side of the high voltage transformer is generally returned to ground, both of these shunt capacitances appear to load the transformer's secondary winding.

Known techniques for solving the problem of self capacitance in a high voltage transformer include increasing the radial dimension of the transformer, separating the windings into many sections and employing universal windings. The known techniques increase leakage inductance and the size of the transformer.

SUMMARY OF THE INVENTION

It is an object of the present invention to provide a protection and a filtering circuit between the source input voltage and the inverter which is effective to protect the inverter against voltage transients.

It is another object of the present invention to provide an input protection circuit for a DC to DC inverter which does not require using substantially overspecified i.e. derated switching elements in the inverter for handling transient input voltages.

It is still a further object of the present invention to provide a power processor system which is effective for generating a very high voltage output using a voltage multiplier and providing improved regulation of the high voltage output.

It is yet another object of the invention to provide a voltage multiplier in a high voltage processor with a coupling circuit between the high voltage transformer and the inverter which is effective for reducing the effects of voltage ringing and overshoot.

It is a further object of the present invention to provide a high voltage power processor which is simple in construction, economical, and effective for producing a regulated high voltage output which closely tracks the regulation that is provided in the main, low voltage, outputs which are produced by the inverter.

It is yet a further object of the present invention to provide, in conjunction with the high voltage power processor of the present invention, a high voltage transformer having an improved construction which reduces the physical size, complexity, self capacitance and cost of the high voltage transformer.

The foregoing and other objects of the present invention are realized with a switch mode power processor having a DC to DC inverter for receiving a comparatively unregulated DC source voltage and for converting it to an AC square wave. Preferably, the inverter is constituted of a transformer having a primary winding one terminal of which is connected to one end of a first switching device such as a transistor and the other terminal which is connected to one end of a second switching device. The other ends of the switching devices are connected to one another and returned to ground. The unregulated input DC source voltage is connected to the center tap of the primary of the transformer and the transistors are alternately actuated to cyclically reverse the current/voltage polarity in the transformer's primary winding.

Each of one or more secondary windings of the transformer therefore produces a square wave the magnitude of which is determined by the respective turns ratio of the secondary winding. The turns ratio of each secondary winding is directly related to the DC voltage level that is to be produced from that winding. Each square wave output is rectified in a respective rectifier circuit, for example, a full wave rectifier bridge, and is thereby converted to an output DC voltage. Typically, this voltage is filtered and regulated in a manner well known to those skilled in the art.

To protect the relatively sensitive switching elements in the inverter, the present invention provides an input protection circuit between the input DC source and the input terminals of the inverter. The protection circuit includes a first L-C network which is connected across the input voltage and a second L-C network which is connected to the terminals of the inverter. A voltage clamping/suppressing device such as a zener diode or the like is disposed between the two L-C networks. The values of the inductances and capacitors are specifically selected to reduce voltage transients from the power source. Preferably, to obtain further protection, the transistors in the inverter are each of the type which includes an integrally formed voltage protection device in the transistor die.

Thus, without using overspecified/derated switching transistors in the inverter and with the aid of a relatively simple input protection circuit, the inverter is immunized to input voltage excursions which could otherwise harm the switching elements of the inverter. The protection circuit is however ineffective against long lasting overvoltage conditions. Accordingly, a fuse is also included in series with the protection device to provide protection against relatively long lasting transients.

To provide a regulated high voltage output, the invention uses a voltage multiplier such as, for example, the well known Crockoft-Walton voltage multiplier in conjunction with a high voltage transformer. To improve the overall efficiency and size of the low voltage transformer of the inverter, the primary winding of the high voltage transformer is connected across the primary winding of the low voltage transformer of the inverter. The connection is made through a coupling circuit which includes capacitor connected in series with one terminal of the primary of the high voltage transformer and a parallel connected resistor and inductor which are disposed in series between the other terminal of the primary of the high voltage transformer and the inverter's primary winding. A resistor is connected in series between the ground referenced terminal of the secondary winding of the high voltage transformer and the ground reference terminal of the high voltage multiplier.

The interconnection of the high voltage transformer to the primary winding of the inverter through the above-mentioned coupling circuit reduces overshoot/ringing/spiking in the high voltage transformer. The result is a relatively well regulated high voltage output, which tracks the regulation that is provided in the low voltage outputs of the inverter.

The invention further provides an improved transformer construction which enhances the functionality of the high voltage transformer in the environment of a switch mode power processor. The high voltage transformer is constructed of a bobbin having a tubular/cylindrical inner wall which defines an interior region for accommodating the core of the transformer and a plurality of radially extending ring-shaped walls which define between themselves channels in which the secondary and primary windings are located. The core itself could be a pot core, an E core, a U core etc., all of which are familiar to those skilled in the art.

Specifically, an insulating material having a relatively low dielectric constant is disposed over the inner wall in each channel. The insulating material may be comprised of several layers of self-adhesive tape. The secondary winding is wound in sections around the insulating material in each channel and the ends of the secondary winding in each channel are connected in series to one another. The secondary windings are covered by a layer of insulating tape and the primary winding is thereafter wound on top of the second layer of insulating tape. And, as with the secondary winding, the several sections of primary winding are connected in series with one another such that the assembled transformer provides a pair each of secondary and primary winding terminals.

This construction reduces the self capacitance of the transformer and thus improves performance, especially voltage regulation when used in conjunction with the above-mentioned coupling circuit. It also provides a high voltage output from a physically smaller transformer.

Other features and advantages of the present invention will become apparent from the following description of the invention which is provided below in relation to the accompanying Figures.

DETAILED DESCRIPTION OF A PREFERRED EMBODIMENT

Figure 1:
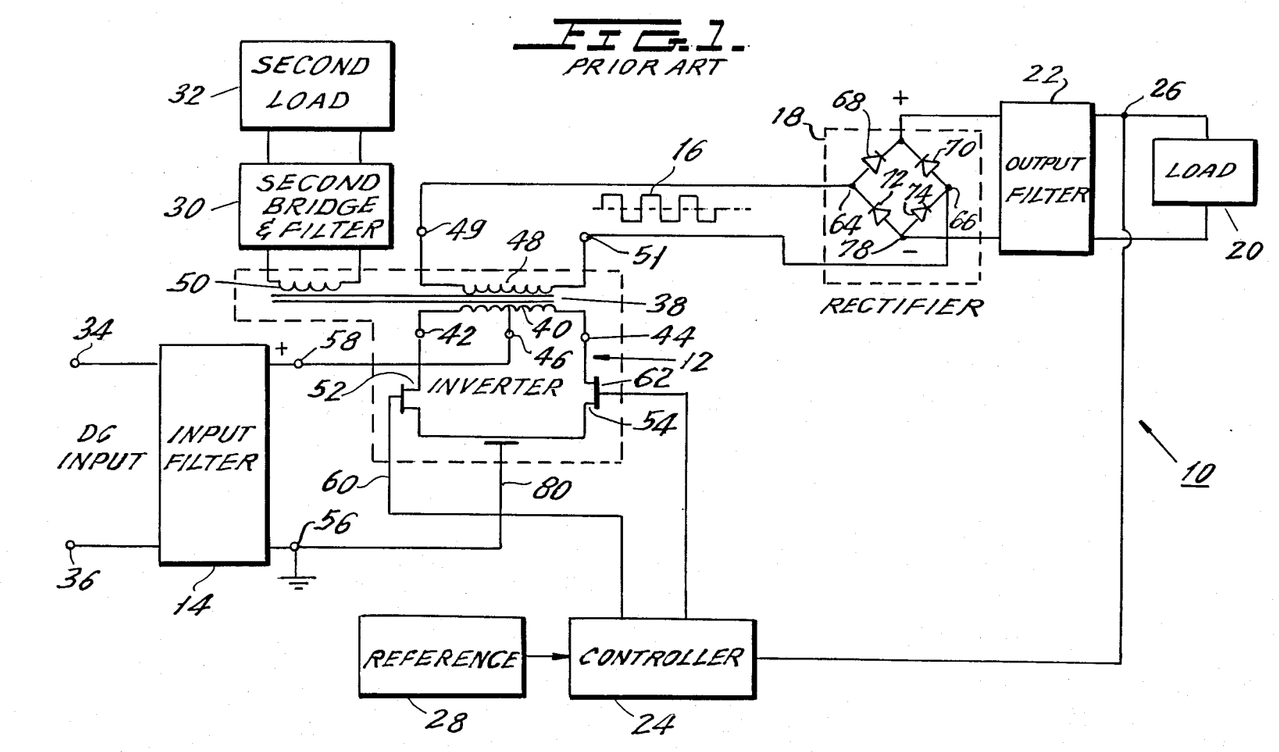
FIG. 1 is a general block diagram of a prior art switch mode power processor.

FIG. 1 is a general block diagram of a prior art switch mode power processor 10 to which the circuits and structures in the remaining Figures. may be applied to improve the operability of the power processor 10. Further, the power processor 10 of FIG. 1 provides a context and environment for the salient aspects of the invention, described later herein. Although the invention will be described in relation to the voltage fed and voltage controlled power processor 10, it is noted that the applicability of the invention is broad and that it encompasses all power processors including current fed and/or current controlled processors.

Power processor 10 includes a DC to DC inverter 12 which receives its input power through input filter 14 and produces a square wave output 16 which is applied to a bridge rectifier circuit 18 to produce a DC output voltage for a low voltage load 20. The DC output voltage is filtered in output filter 22. DC to DC inverter 12 is controlled by a controller 24 which compares the output DC voltage at node 26 to a voltage provided by reference 28 to provide control signals for DC to DC inverter 12 that work to regulate and maintain the output voltage at node 26 within prescribed specifications Additional DC output voltages may be derived from inverter 12 with additional secondary windings on the transformer 48 and rectifiers such as secondary winding 50 and rectifier and filter 30 which provide a second output voltage to a second load 32.

More specifically, power processor 10 includes DC input terminals 34 and 36 to which a relatively unregulated DC input voltage is applied. This unregulated DC input voltage may be obtained from the AC power line with a rectifier and filter capacitor or the source may be an inherent DC source such as a battery or a vehicle's power bus. The DC input voltage is applied to input filter 14 which is designed to reduce EMI and/or to provide a smooth energy flow to DC to DC inverter 12.

Inverter 12 includes a transformer 38 having a center tapped primary winding 40 with a first terminal 42, a second terminal 44 and a center tap 46. First and second secondary windings 48 and 50 are coupled to primary winding 40

The first terminal 42 of transformer 38 is connected to the drain of a MOSFET transistor 52 and the second terminal 44 of transformer 38 is connected to the drain of a second MOSFET transistor 54. The respective sources of transistors 52 and 54 are connected to one another and returned to the ground terminal 56 of input filter 14. The other terminal 58 of filter 14 is connected to the center tap 46.

The respective gate control electrodes 60 and 62 of transistors 52 and 54 are connected to controller circuit 24 which controls the conduction durations of transistors 52 and 54 in a manner which will be explained below.

The first secondary winding 48 is connected, through terminals 49 and 51 thereof, to the AC terminals 64 and 66 of the well-known full wave bridge rectifier circuit 18 which is comprised of diodes 68, 70, 72 and 74. The DC terminals 76 and 78 of bridge rectifier circuit 18 are connected to output filter 22 and the voltage at node 26 is applied to load 20.

The power processor 10 operates as follows. The DC voltage at the center tap 46 of transformer 38 is alternatively and cyclically conducted either through transistor 52 or transistor 54 and returned through line 80 to the ground terminal of input filter 14. The transistors 52 and 54 are turned on mutually exclusively of one another with the conduction durations and/or cycling period being controlled by controller circuit 24 to maintain the output at node 26 within specification. The cyclical operation of transistors 52 and 54 produces at each of secondary windings 48 and 50 an "anti-phased" square wave such as square wave 16. The voltage level of square wave 16 depends on several factors but is primarily determined by the respective turns ratio between the secondary winding and the primary winding cf transformer 38. By rectifying the square wave 16 one obtains an essentially constant DC voltage which equals to the peak magnitude of square wave 16.

Typically, transistors 52 and 54 are turned on and off at a frequency in the range of 20–100 kHz.

The output voltage at node 26 is fed back to controller circuit 24 which controls transistor 52 and 54 in any one of several well-known methods including pulse width or frequency modulation or any other technique to provide just enough power through transformer 38 to maintain the desired voltage level at node 26 constant. Numerous modulation and control techniques are known in the art as exemplified by the many patents which are classified under U.S. patent class 363, the teaching of which patents is incorporated herein by reference.

Figures 2, 6:
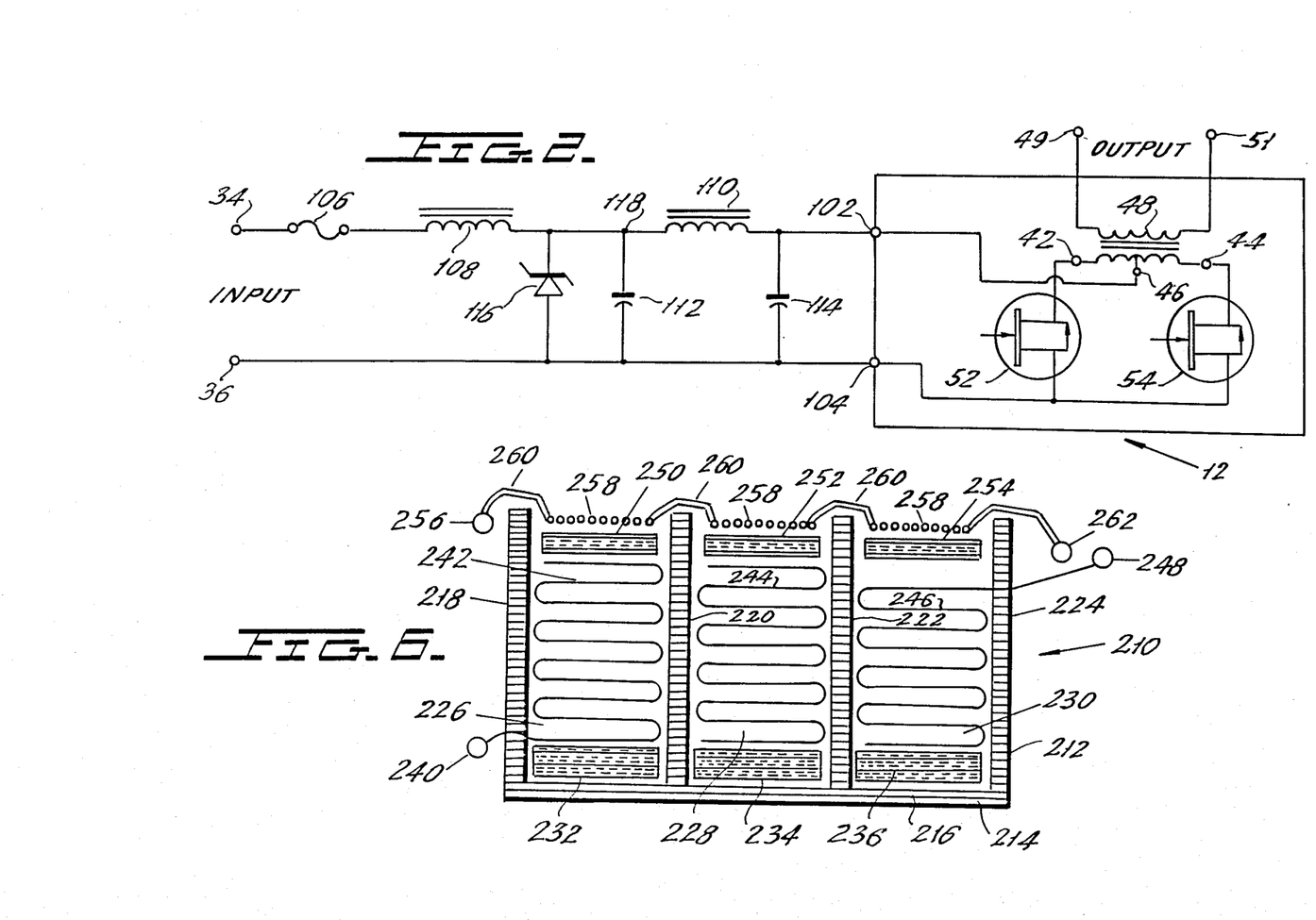
FIG. 2 is a schematic of the DC to DC inverter having a protection and filtering circuit for providing protection against input transients.
FIG. 6 is a cross-section through one-half of a bobbin an associated windings and insulations of a high voltage transformer in accordance with FIG. 5.

The DC input at terminals 34 and 36 is relatively unregulated. The primary source of that voltage is often connected to other devices including inductive loads, lamp igniters and the like. The input voltage is therefore prone to voltage transients, spikes or ripples which could damage the sensitive electronic switches, such as MOSFET transistors 52 and 54, should the transients propagate to inverter 12. Therefore, in accordance with the present invention and as depicted in FIG. 2, an input protection and filtering circuit 100 is provided for protecting transistors 52 and 54 from the overvoltage or transient effects.

Input protection circuit 100 is applied to inverter circuit 12, replacing the input filter circuit 14 of FIG. 1. Although a push-pull style inverter is shown throughout the Figures, the protection circuit of the present invention could be used in conjunction with any switch mode type power processor or DC to DC inverter. The protection circuit 100 is connected between terminals 34 and 36 on the one hand and terminals 102 and 104 of inverter 12 on the other hand. Input power enters through terminal 34 and flows through fuse 106, first inductor 108 and second inductor 110 into inverter input terminal 102. Current flows out from inverter 12 through terminal 104 and returns to the ground terminal 36.

Input protection circuit 100 further includes a first capacitor 112 which is connected between node 118 and ground line 120. A second capacitor 114 is connected across the input terminals of inverter 12. A transient absorbing zener diode 116 is connected in parallel with capacitor 114 as shown. Zener diode 116 is a shunt protective component which clamps the voltage at node 118 to the rated clamping voltage of the zener diode.

Input protection circuit 100 may be viewed as having three circuit sections including a first L-C filter constituted of inductor 108 and capacitor 112, a second L-C filter comprised of inductor 110 and capacitor 114 and the zener diode 116 circuit which is electrically disposed between the two L-C circuits.

The protection circuit of the present invention provides three different protection mechanisms which cooperate with one another to provide an extremely high degree of immunity to overvoltage transients. The first measure of protection is provided by the first and second L-C filters since as the input voltage passes past these filters, any input transients will suffer the 12 decibel per octave attenuation of each L-C filter before reaching inverter 12. Moreover, the filters provide a measure of radio frequency interference attenuation in addition to providing the protective function. Capacitor 114 may provide the added function of serving as a bus filter capacitor for the inverter 12.

The second measure of protection is provided by zener diode 116 which operates in conjunction with the first L-C filter as follows. Current from terminal 34 flows into zener diode 116 through the series impedance which is provided by inductor 108 Overvoltage transients will appear instantaneously across inductor 108. The physics of the inductor will, however, limit the rate of change in current through the inductor by the V/L ratio associated therewith; according to the well known equation $V = L \, di/dt$, that is, the voltage which is applied across the inductor divided by the inductance value.

The value of inductor 108 is deliberately chosen to limit the current to the maximum current which zener diode 116 is exposed during the longest expected transient. This maximum current is selected based on the specification of zener diode 116 and the maximum voltage that may be applied to switching transistors 52 and 54, according to the clamping ratio graph of the zener diode. The effect of inductor 108 is to enhance the clamp ratio of the transient absorbing zener 116, since the change in current with time through the zener diode is reduced during the input transient. In other words, the current flowing through the zener 116 is limited during the transient such as to improve the clamping effect of the zener diode 116. The fuse 106 provides protection against long lasting transients which are capable of saturating inductor 108, or of causing high dissipation in the zener due to high currents. A long lasting transient will blow fuse 106 and open the circuit.

To provide a third measure of protection, the switching transistors 52 and 54 of inverter 12 are power MOSFET transistors which are specified to incorporate inherent avalanche protection and built-in transient absorbing zeners. Such transistors are commercially available from several manufacturers including Motorola of Phoenix, Ariz., or International Rectifier of El Segundo, Calif. Such devices include an inherent zener with each MOSFET cell. This greatly increases the energy which the MOSFET transistor is capable of absorbing without being damaged and allows the transistor to tolerate any remaining transient energy which may leak past the input protection circuit 100. Together, the above-mentioned measures allow the inverter 12 to withstand any foreseeable input voltage transients. The overall reliability of the power processor 10 is increased even in environments which are very prone to input transients.

Figure 3:
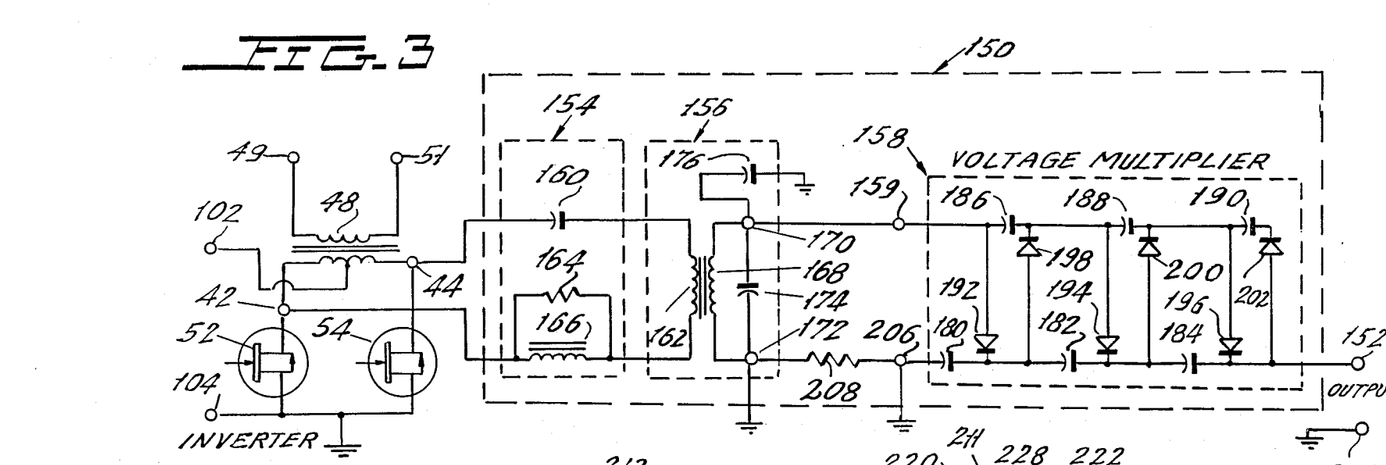
FIG. 3 is a schematic of the inverter together with a voltage multiplier/high voltage transformer circuit which is connected through a coupling circuit to the inverter.

Turning now to FIG. 3, high voltage generating circuit 150 produces a DC output voltage as high as 5 to 25 kilovolts or even higher from the power which is provided from inverter 12. Although not specifically depicted in FIG. 3, secondary winding 48 of inverter 12 drives a rectifier and a load and includes means for regulating the relatively low voltage power which is provided through secondary winding 48, terminals 49 and 51, as previously described.

A high voltage is produced at node 152 by high voltage generating circuit 150 which includes coupling circuit 154, high voltage transformer 156 and voltage multiplier 158.

The coupling circuit 154 includes a capacitor 160 which is connected between one terminal of primary winding 162 of high voltage transformer 156 and the drain 44 of transistor 54.

The other terminal of the primary winding 162 is connected to one common node of the parallel connected resistor 164 and inductor 166. The other common node of resistor 164 and inductor 166 is connected to the drain of transistor 52.

The high voltage transformer 156 has a secondary winding 168 which extends between secondary winding terminals 170 and 172.

The transformer 156 contains inherently distributed parasitic capacitances which are graphically represented by capacitance 174 which represents the inter-winding shunt capacitance, and a second capacitance 176 which represents the capacitance of the high voltage end of the secondary winding to ground.

The high voltage output terminal 170 of secondary winding 168 is applied to the input terminal 159 of the Crockoft-Walton voltage multiplier 158. The configuration of this type of voltage multiplier is well known in the art. It is known to provide a step up of the peak square wave voltage which is produced at secondary winding 168 to a DC voltage which equals to the input voltage multiplied by the number of stages that are included in the voltage multiplier.

In the voltage multiplier which is illustrated in FIG. 3 there appear capacitors 180, 182, 184, 186, 188, and 190 a plurality of high voltage diodes 192, 194, 196, 198, 200, and 202. The high voltage DC output appears at terminal 152 and a high voltage load may be connected between that terminal and a return terminal 204. The input return line of the high voltage multiplier 158 is connected to the ground of the power processor at terminal 206.

In operation, the AC high frequency square wave signal which appears at the drains of the inverter transistors 52, 54 is applied to the primary winding 162 of the high voltage transformer 156. The resistor 164 limits the instantaneous peak charging current immediately after any transition point of the inverter's square wave.

This charging current is due to the capacitances in the Crockoft-Walton multiplier, appearing reflected as a capacitance load at the primary winding. The current is determined by I=C dv/dt and the dv/dt is high on the square wave transitions and therefore the current "I" is high at that interval.

Also, an additional capacitive load is imposed on the inverter 12 by the reflection of the capacitance 176 which exists between the high voltage output 170, at the secondary winding 168, and ground. A charging current would normally flow from the high voltage output 170, through the capacitor 176 to ground. That current is thereafter returned to the transformer's secondary winding at terminal 172. Since this point is normally connected to ground, the inherent shunt capacitance 176 normally appears connected in parallel with the secondary winding 168.

The time constant which is associated with the inductor 166 and resistor 164 (L/R) is chosen so as to limit the peak charging current which will flow just after the transition in the square wave, in a manner which allows the load current to pass hindrance free through inductor 166 during substantially the entire interval of each half cycle of the square wave but limits the capacitive charging current during the transition period. The effect is to limit the current that would charge the shunt capacitances 174 and 176 at secondary winding 168.

The deleterious effect of the high voltage to ground capacitance 176 may be reduced by placing a resistor 208 in series in a path from node 172 to ground 206. This resistor 208 is chosen such that a substantial voltage drop is suffered by the capacitive charging currents flowing through resistor 208. However, the resistance is chosen to be low enough to minimize power losses due to the load current which is provided from voltage multiplier 158 into the high voltage load (not shown).

In FIG. 3, capacitor 160 block DC components present in the inverter output from saturating the core of transformer 156.

The combination of the coupling network 154 with the output current limiting resistor 208 serves to greatly reduce the problem of capacitances charging currents in the high voltage transformer and the attendant voltage overshoots. Hence, voltage overshoots at the output terminals of the secondary winding 168 are reduced and this results in a substantial improvement in the voltage regulation since the voltage multiplier 158 will have less tendency to produce a higher than normal value of the high voltage in response to voltage overshoots. Also, at light loads, a virtually perfect square wave is obtained, in contrast to the extremely distorted square wave with the ringing and overshoot problems which are experienced at light loads in prior art designs.

Figure 4:
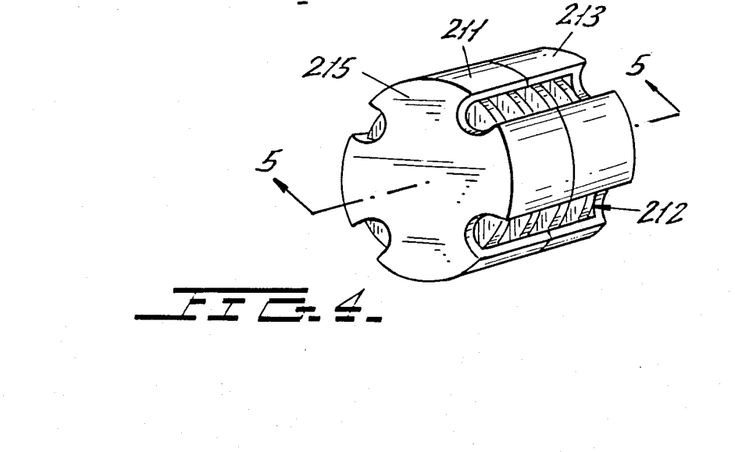
FIG. 4 is a perspective of a high voltage transformer.

FIG. 4 illustrates a cylindrically shaped high voltage transformer 210 with a ferrite "pot core" 215, formed of two halves 211, 213, which enclose a bobbin 212 and associated windings which are illustrated in FIG. 6.

Figure 5:
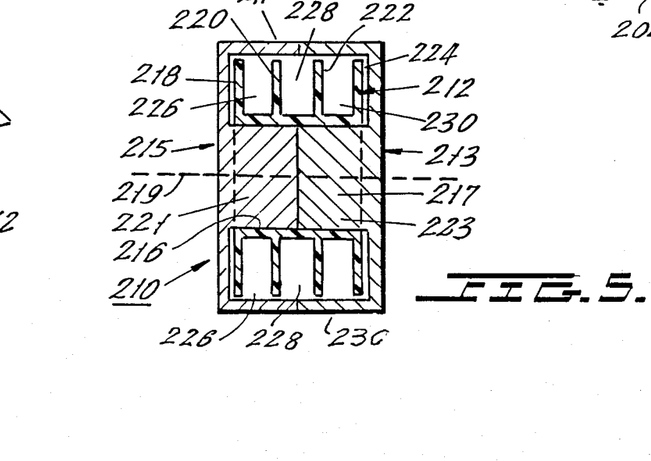
FIG. 5 is a cross section through line 5—5 in FIG. 4.

As seen in the cross-sectional view of FIG. 5, the bobbin 212 has several sections and is comprised of an inner tube 216 and several radially and annularly extending side walls 218, 220, 222, 224 which define between themselves a plurality of annular winding channels 226, 228 and 230. The bobbin 212 is comprised of an insulating plastic material, the insulating material being denoted by reference numeral 214 in the cross-sectional view in FIG. 6. The bobbin 212 extends symmetrically about a central axis 219 and its inner tube 216 encloses and defines an interior region 217 for a core.

The left hand half 211 of "pot core" 215 encloses the left half of bobbin 212 and has a protruding central core piece 221 which penetrates into the interior region 217. Similarly, the right hand half 213 of "pot core" 215 encloses the right half of bobbin 212 and includes a central core piece 223 which penetrates into the interior region 217 so that the interior region 217 is filled with core material. Alternatively, transformer 210 may have another type of a core such as for example an E core, a U core or any other type of core structure.

In accordance with the present invention, primary and secondary windings and associated insulating materials are disposed in the channels 226, 228 and 230 as illustrated in FIG. 6. Thus, the inner tube 216 of bobbin 212, on the side thereof which faces channels 226, 228 and 230, is covered with several layers of insulating material 232, 234, and 236.

The insulating material has good insulation resistance and a relatively low dielectric constant. Such material can be constituted of self-adhesive insulating tapes. The insulating tape serves to separate and to space the windings that will be wound in the channels from the region 217 of bobbin 212, where the core is located. This is to reduce the capacitance from that end of the voltage winding which is marked by reference numeral 240 to the transformer core 221, 223 and also to space the winding from the bobbin itself. This is because the material of the bobbin 212 is necessarily formed of a relatively high dielectric constant material, which tends to increase the self-capacitance of the transformer to the transformer core in prior art designs.

A high voltage secondary winding is provided in several sections including winding sections 242, 244 and 246, each section being located respectively in channels 226, 228 and 230. The first secondary winding section begins at point 240 and is wound to fill the majority of the first channel 226. The second and third winding sections respectively fill channels 228 and 230, as shown. These individual sections of winding are interconnected in series such that a secondary high voltage winding is provided between terminals 240 and 248, as shown. It should be noted that terminal 240, at the beginning of the high voltage secondary winding, provides the high voltage end of the secondary winding, while terminal 248 constitutes the low side of the secondary winding.

A second additional layer of insulating material having similar resistance and dielectric properties is applied over the high voltage secondary winding in each channel as denoted by reference numbers 250, 252 and 254. The second insulation layer acts to reduce the capacitance from each high voltage secondary winding section to the primary winding of the transformer and also to the transformer core.

A primary, low voltage, winding 258 is applied last and is started at terminal 256 in the first channel 226. Typically, it is constituted of a single layer winding as shown. Similar windings are applied in channels 228 and 230. The individual primary winding layers 258 are interconnected by jumpers 260. The primary winding terminates at primary terminal 262.

The combined effect of low dielectric constant insulating material nearest the core, the construction of the secondary high voltage winding as an aggregate of several sections of winding, the application of the additional insulating material between the secondary and primary windings and the formation of the primary winding around the outer periphery of the transformer winding results in an overall substantial reduction in the self-capacitance between the windings and in the capacitance from the high voltage winding to ground.

The reduction in these capacitances provides a substantially improved performance in the high voltage transformer, by reducing peak charging currents. This improves voltage regulation and reduces voltage overshoots when driving light loads. The present invention substantially reduces the overall size of the transformer and provides a substantial advantage in the realization of small, lightweight equipment such as portable or airborne systems.

Although the present invention has been described in connection with a specific embodiment thereof, many other modifications, variations and other uses will now become apparent to those skilled in the art. It is preferred, therefore, that the present invention be limited not by the specific disclosure herein but only by the appended claims.

What is claimed is:

1. A power processor comprising:
   a switch mode inverter;
   power input voltage terminals for applying therethrough a DC input voltage for said switch mode inverter; and
   a high voltage generating circuit for generating a high voltage DC output, said high voltage generating circuit including a high voltage transformer having a primary winding and a coupling circuit for coupling said primary winding of said high voltage transformer to said inverter, said coupling circuit including a parallel connected inductor/resistor circuit connected between one terminal of said primary winding of said high voltage transformer and said inverter.

2. The power processor of claim 1, wherein said coupling circuit further includes a capacitor connected between another terminal of said primary winding of said high voltage transformer and said inverter.

3. The power processor of claim 2, further including a voltage multiplier.

4. The power processor of claim 3, wherein said voltage multiplier is a Crockoft-Walton type voltage multiplier.

5. The power processor of claim 4, wherein said voltage multiplier comprises a low voltage input terminal and said high voltage transformer comprises a secondary winding and said secondary winding has its respective low voltage terminal and further comprising an impedance element disposed between the respective low voltage terminal of said voltage multiplier and said secondary winding.

6. The power processor of claim 5, wherein said impedance device is a resistor.

7. The power processor of claim 6, wherein said power processor is effective for producing from said voltage multiplier a DC voltage output of at least 5 kilovolts.

8. The power processor of claim 6, wherein said inverter comprises first and second MOSFET switching devices and wherein said one terminal of said primary winding of said high voltage transformer is coupled to the first one of said MOSFET switching devices and the other terminal of said primary winding of said high voltage transformer is coupled to said second MOSFET switching device.

9. The power processor of claim 6, wherein said inductor/resistor network has a time constant which is effective for limiting current transients during each transition in the polarity of a square wave signal which is provided from said inverter.

10. The power processor of claim 17, wherein said high voltage transformer comprises:
a bobbin constructed of insulating material, said bobbin having an inner tube which is symmetrically disposed around an axial axis and a plurality of radially extending side walls which extend radially outwardly from said inner tube and which define between themselves a plurality of channels, said bobbin being constructed of an insulating material having a first predetermined high dielectric constant;
a first insulation disposed around said bottom wall of said bobbin in each channel, said first insulation being formed of a material having good insulation resistance and a relatively low dielectric constant which is lower than said dielectric constant of said bobbin;
a secondary winding, said secondary winding being comprised of a plurality of secondary winding sections, each secondary winding section being wound in and substantially filling a respective one of said channels, said secondary winding sections being connected in series with one another;
a second insulation, formed of a material having good insulation resistance and a relatively low dielectric constant which is lower than said dielectric constant of said bobbin, disposed around said secondary winding in each said channel; and
a primary winding disposed about said second insulation in each channel.

* * * * *